(12) United States Patent
Patterson

(10) Patent No.: US 7,632,039 B2
(45) Date of Patent: Dec. 15, 2009

(54) METHODS FOR COMPENSATING BEACH EROSION

(75) Inventor: Frank L. Patterson, 9815 Highway 98 West, BV 17, Destin, FL (US) 32550

(73) Assignee: Frank L. Patterson, Pelham, AL (US)

( * ) Notice: Subject to any disclaimer, the term of this patent is extended or adjusted under 35 U.S.C. 154(b) by 85 days.

(21) Appl. No.: 11/488,209

(22) Filed: Jul. 18, 2006

(65) Prior Publication Data
US 2007/0036611 A1   Feb. 15, 2007

Related U.S. Application Data

(60) Provisional application No. 60/700,210, filed on Jul. 18, 2005.

(51) Int. Cl.
*E02B 3/04* (2006.01)
(52) U.S. Cl. .................... 405/15; 405/116; 405/117; 405/302.6; 37/342
(58) Field of Classification Search ............... 405/116, 405/117, 15, 302.6; 37/340–342, 348
See application file for complete search history.

(56) References Cited

U.S. PATENT DOCUMENTS

| | | | |
|---|---|---|---|
| 4,393,607 A | 7/1983 | Hirosawa | |
| 4,420,275 A * | 12/1983 | Ruser | 405/217 |
| 5,598,648 A | 2/1997 | Moriya et al. | |
| 6,823,616 B1 * | 11/2004 | Gutter et al. | 37/461 |

* cited by examiner

*Primary Examiner*—David J Bagnell
*Assistant Examiner*—Sean D Andrish
(74) *Attorney, Agent, or Firm*—Lanier Ford Shaver & Payne, P.C.; Jon E. Holland

(57) ABSTRACT

In accordance with at least one methodology of the present disclosure, an excavating machine (e.g., excavator, backhoe, bulldozer, etc.) moves an excavating apparatus (e.g., a bucket, blade, etc.) such that the excavating apparatus skims the underwater surface of a beach close to the shoreline to gather sand thereby forming a shallow trench in such surface. The depth of trench is small so that the effects of the sand removal to the contour of the beach is quickly compensated by the wave action of the ocean. Although the depth of the removed layer of sand is small, a significant amount of sand can be gathered by continuing the skimming operation over a much longer horizontal distance relative to the vertical depth of the removed sand. Moreover, by repeating the skimming operation along a shoreline, large amounts of sand can be gathered from the underwater surface of a beach close to the shoreline without a significant prolonged impact to the beach's underwater surface contour.

22 Claims, 9 Drawing Sheets

METHODS FOR COMPENSATING BEACH EROSION

CROSS REFERENCE TO RELATED APPLICATION

This application claims priority to U.S. Provisional Application No. 60/700,210, entitled "Method for Compensating Beach Erosion," and filed on Jul. 18, 2005, which is incorporated herein by reference.

RELATED ART

Beach erosion can cause significant damage to a beach and can threaten structures erected on a beach or within close proximity of a beach. The primary source of beach erosion is the effect of ocean waves, which can pull sand from a beach and/or shift sand in an undesirable manner. As ocean levels continue to rise due to atmospheric warming, the effects of beach erosion continue to worsen, and beach erosion can be particularly exacerbated during strong storms, such as hurricanes.

Significant effort and expense have been expended in efforts to preserve the world's beaches and to compensate for beach erosion. In the past, dredging has been used to replace sand washed away by an ocean. During a dredging operation, a vessel travels out to sea, and specialized equipment on the vessel is used to dredge an ocean's floor to gather sand from the depths of the ocean. The gathered sand is then hauled or pumped to a beach where erosion has occurred and is dumped on the beach to compensate for sand previously washed from the beach by the ocean.

If dredging operations are performed close to shore, then swimmers' enjoyment of the beach can be significantly impacted. In this regard, many swimmers remain within a short distance up to about 100 to 200 feet of the shore where the depth of the ocean is shallow enough such that the ocean's waves break. If a dredging operation is performed within this region, the ocean's floor can be significantly changed adversely affecting swimmers' enjoyment of the ocean. Indeed, removal of sand within close proximity of the shore (e.g., up to approximately 100 to 200 feet) can significantly change where the ocean's waves begin breaking and can significantly change the locations where swimmers are able to touch the ocean's floor without being completely submerged. Thus, dredging operations are normally performed in deep water far away from shore so that dredging will not have a significant impact on the contour of ocean's floors in areas where people often swim and/or perform other beach related activities. Indeed, many governments prohibit or significantly restrict dredging operations at or within a close distance of a shore.

The equipment needed to perform dredging in deep water can be expensive. Further, before a dredging operation is commenced, studies of an ocean's floor are sometimes done in an effort to find sand that closely matches the sand already at the beach to be serviced by the dredging operation. Such studies can be burdensome and expensive. Indeed, the overall costs of performing all aspects of a dredging operation can be significant. Nevertheless, in many situations, there is often no better alternative to a dredging operation for repairing a damaged beach, and dredging operations are widely used even though such operations are extremely expensive and time consuming.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to methods for compensating beach erosion. In accordance with at least one methodology of the present disclosure, an excavating machine (e.g., excavator, backhoe, bulldozer, etc.) moves an excavating apparatus (e.g., a bucket, blade, etc.) such that the excavating apparatus skims the underwater surface of a beach close to the shoreline to gather sand thereby forming a shallow trench in such surface. The depth of the trench is small so that the effects of the sand removal to the contour of the beach is quickly compensated by the wave action of the ocean. Although the depth of the removed layer of sand is small, a significant amount of sand can be gathered by continuing the skimming operation over a much longer horizontal distance relative to the vertical depth of the removed sand. Moreover, by repeating the skimming operation along a shoreline, large amounts of sand can be gathered from the underwater surface of a beach close to the shoreline without a significant prolonged impact to the beach's underwater surface contour.

Figure 1:
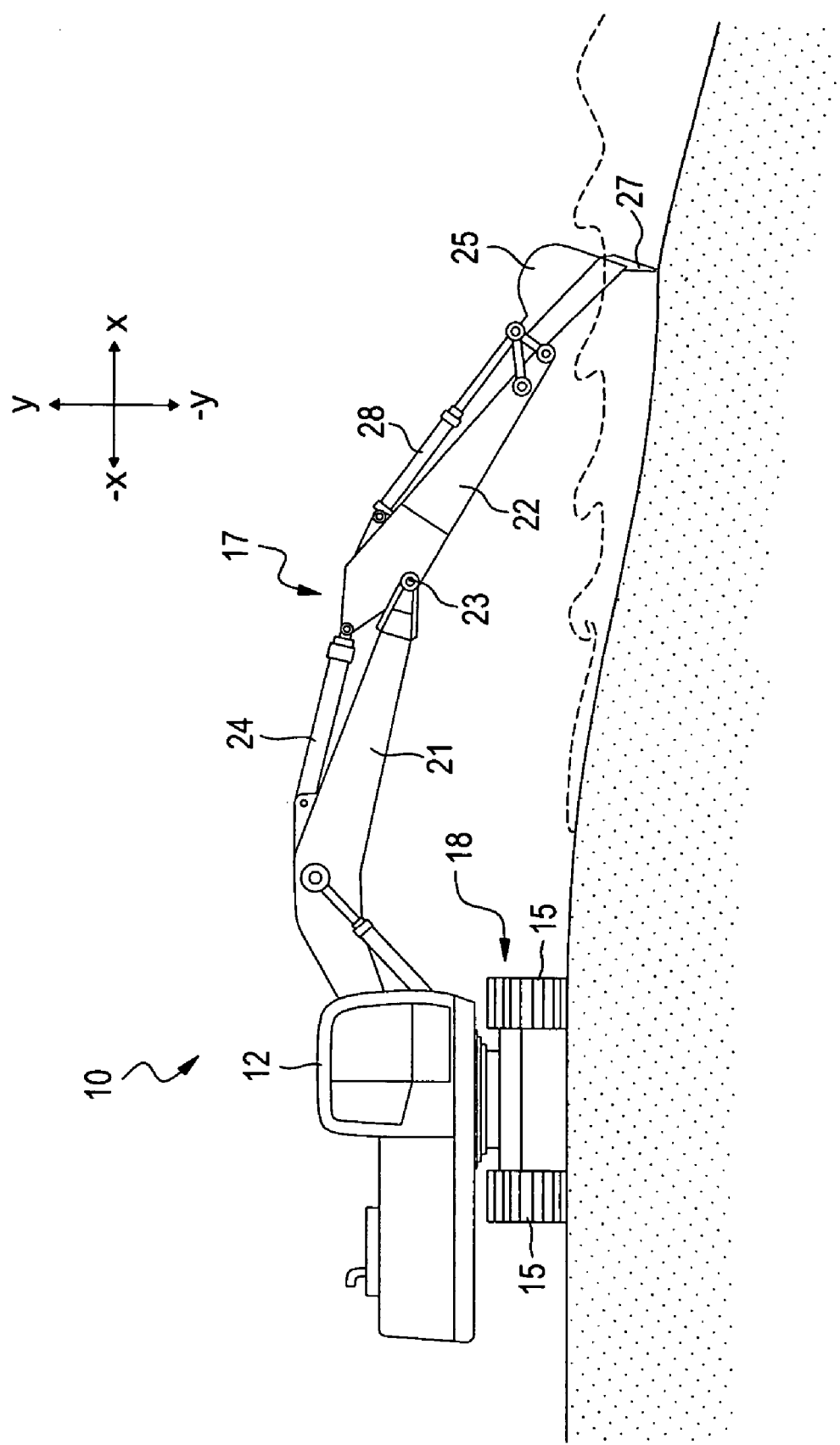
FIG. 1 illustrates an exemplary excavating machine that may be used to perform trenching operations in accordance with the present disclosure.

FIG. 1 depicts an exemplary excavating machine 10 that may be employed to repair a damaged beach in accordance with one embodiment of the present disclosure.

In the embodiment depicted by FIG. 1, the excavating machine 10 is a conventional excavator. However, it is to be understood that, in other embodiments, other types of excavating machines may be used, such as, for example, bulldozers, backhoes, loaders, etc.

The excavating machine 10 of FIG. 1 has a cab 12 in which an operator of the machine 10 may be situated. The excavating machine 10 also has a base 18 comprising a pair of motorized tracks 15 that enable movement of the excavating machine 10 in accordance with known techniques. In other embodiments, other components, such as wheels, may be used in lieu of the tracks 15 to allow movement of the excavating machine 10.

As shown by FIG. 1, the excavating machine 10 has a boom 17 that is attached to the cab 12. The cab 12 is pivotally mounted to the base 18 so that the cab 12 and the boom 17 attached thereto can swivel in a horizontal direction (i.e., swivel in a plane parallel to the x-direction and perpendicular to the y-direction). The boom 17 has two sections 21 and 22. The boom section 22 is pivotally mounted on the boom section 21 such that the section 22 can pivot about point 23. A hydraulic arm 24 controls pivoting of the section 22 about point 23 in accordance with known techniques.

Further, an excavating apparatus 25 is pivotally mounted to an end of the boom section 22 so that the apparatus 25 can pivot with respect to the boom section 22. In the embodiment shown by FIG. 1, the excavating apparatus 25 is a bucket such as those commonly found on any conventional excavator. A lip of the apparatus 25 has a plurality of teeth 27 to facilitate insertion of the apparatus 25 into objects, such as the ground. A hydraulic arm 28 can be used to pivot the apparatus 25 about the end of the boom section 22 in accordance with known techniques. In addition, the boom 17 is pivotally mounted on the cab 12 such that the boom 17 can pivot in order to raise or lower (in the y-direction or negative (−) y-direction) the apparatus 25.

The configuration of the boom 17 allows for a full three-dimensional range of movement for the apparatus 25 with respect to the base 18. Moreover, the configuration of the excavating machine 10 of FIG. 1 is known and widely used in the industry, and various other types of excavators may be used in other embodiments.

Indeed, U.S. Pat. No. 4,393,607, which is incorporated herein by reference, describes an exemplary excavator that may be used to implement the methodologies of the present disclosure.

Figure 2:
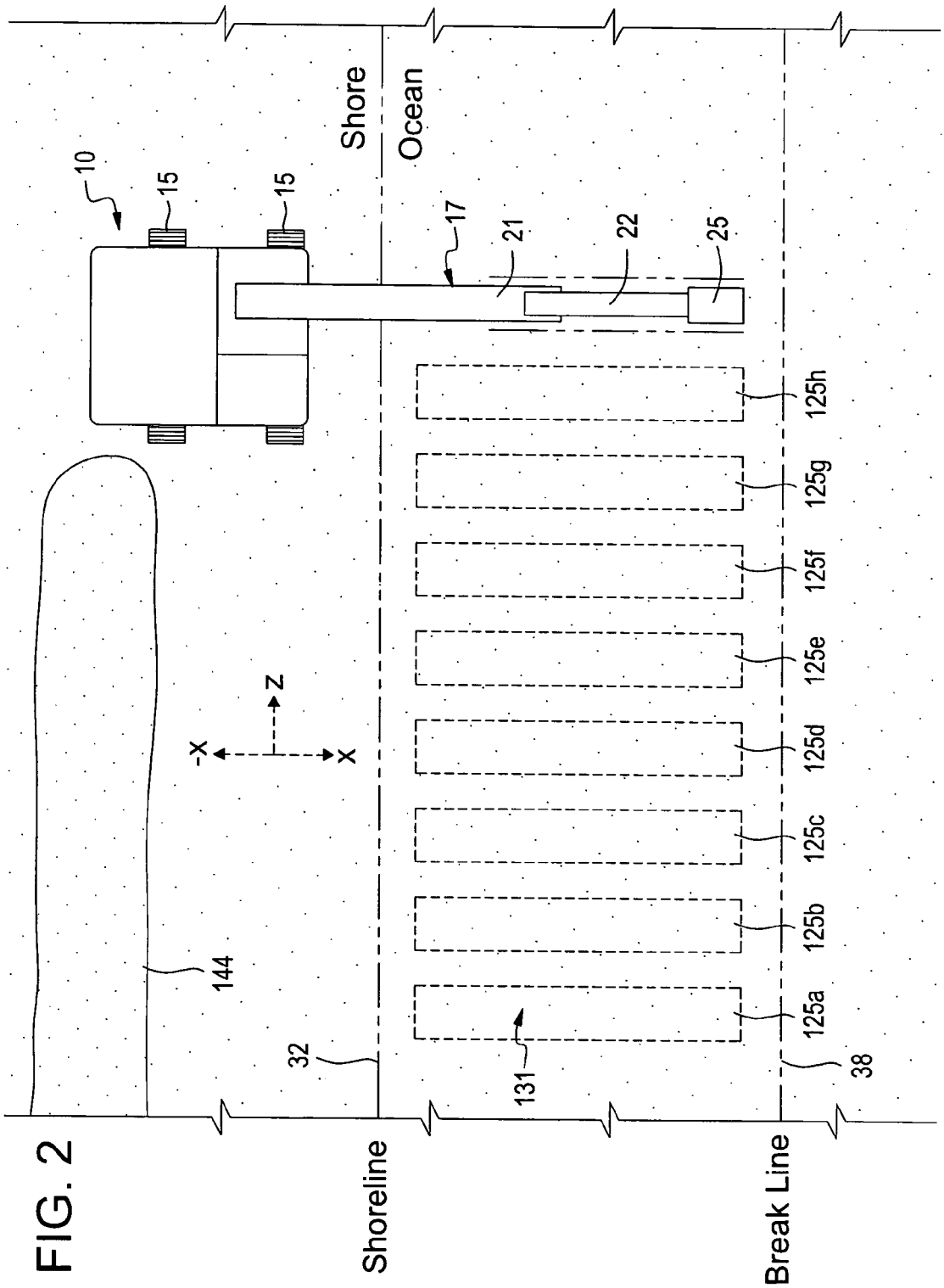
FIG. 2 illustrates a top view of the excavating machine of FIG. 1 while the excavating machine is at a beach performing trenching operations.

In at least one exemplary embodiment, the excavating machine 10 is positioned at the edge of an ocean, preferably just a few feet from the reach of the ocean's waves, as depicted by FIG. 2. In this regard, assume that line 32, referred to herein as the "shoreline," in FIG. 2 represents the farthest approximate position that ocean waves reach during a given time period, such as for example, approximately one hour. Thus, by staying above the line 32, as shown by FIG. 2, (i.e., on an opposite side of the line 32 with respect to the ocean), during the given time period, the excavating machine 10 should not be struck by an ocean wave. Note that it is possible for the excavating machine 10 to be positioned within the ocean's water or to be positioned such that waves periodically strike the tracks 15 or other portions of the excavating machine 10. However, placement of the tracks 15 in the water has the undesirable effect of exposing them to ocean water. It is well-known that ocean water facilitates corrosion and/or rusting of metallic components and can otherwise damage various machine components. Moreover, keeping the tracks 15 and other components of the machine 10 out of the ocean's water helps to prolong the useful life of the excavating machine 10 and/or decrease maintenance costs.

Although the excavating machine 10 can be positioned more than just a few feet from the water's edge, the further that the excavating machine 10 is placed from the water, the shorter is the machine's reach across the ocean's surface. As will be apparent from the teachings hereafter, it is generally desirable for the apparatus 25 to have a relatively long reach across the ocean's water. Thus, positioning the excavating machine 10 as close as possible to the edge of the water provides the apparatus 25 with the longest possible reach across the water in the x-direction without exposing the tracks 15 to the ocean's water.

Figure 3:
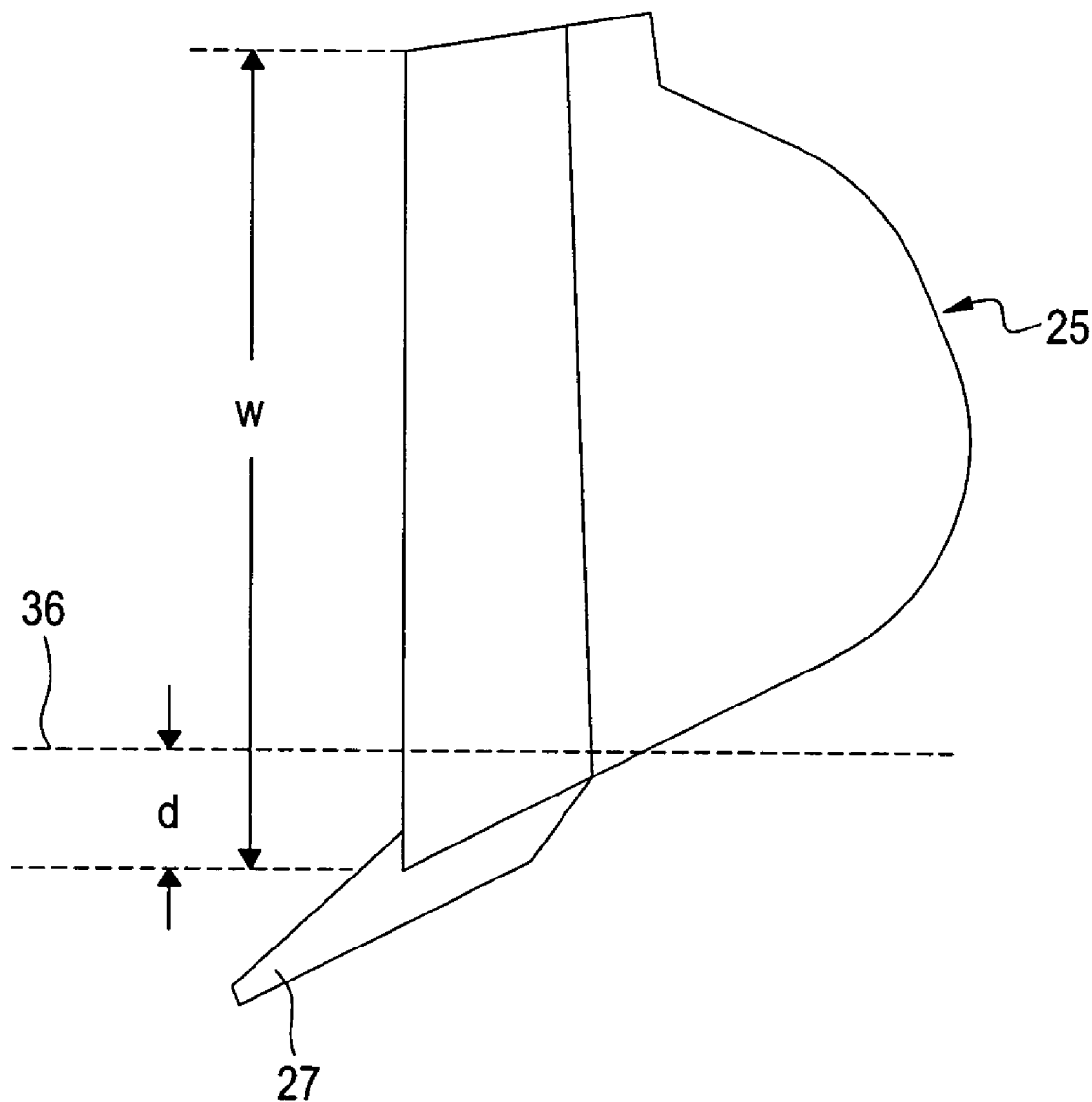
FIG. 3 illustrates a side view of an exemplary excavating apparatus used by the excavating machine of FIG. 1 to perform trenching operations.

In one exemplary embodiment, the boom 17 is extended such that the apparatus 25 is moved over the surface of the ocean in the x-direction. Once the apparatus 25 has reached the farthest possible point in the x-direction, the apparatus 25 is lowered (in the negative (−) y-direction) into the ocean's water and partially submerged, teeth first, in the sand on the floor of the ocean. The apparatus 25 is submerged such that only a small portion of the apparatus 25 is below the surface of the sand. For example, referring to FIG. 3, a typical width (w) of an excavating apparatus 25 is several feet. In one exemplary embodiment, however, the apparatus 25 is submerged about 6 inches to about 1 foot in the sand. In this regard, assuming that line 36 in FIG. 3 represents the surface of the sand in which the apparatus 25 is inserted, the depth (d) is about 6 inches to 1 foot. Thus, a significant portion of the apparatus 25 remains above the sand, although submerged in the ocean's water. In other embodiments, other depths (d) are possible.

After partially submerging the apparatus 25 in the sand, the boom 17 is operated such that the apparatus 25 is pulled toward the excavating machine 10 in the negative (−) x-direction. Preferably, as the apparatus 25 is being pulled toward the excavating machine 10, its depth in the sand is kept substantially constant. Thus, the teethed lip of the apparatus 25 preferably remains the same approximate distance below the surface of the ocean floor as the apparatus 25 is being pulled toward the excavating machine 10. In other words, the apparatus 25 skims across the ocean floor without significantly changing its depth in the ocean floor. Therefore, the apparatus 25 essentially digs a shallow trench of substantially uniform depth as it moves toward the excavating machine 10 and, therefore, the shore. Note that, if the surface of the ocean floor is inclined such that it changes in the y-direction as the apparatus 25 moves closer to the excavating machine 10, then the apparatus 25 may be moved in the y-direction as it is being pulled toward the excavating machine 10 in order to keep the apparatus 25 submerged at the same approximate depth in the sand.

As the apparatus 25 is being pulled in the negative (−) x-direction toward the excavating machine 10, sand accumulates in the apparatus 25. The farther that the apparatus 25 travels in the negative (−) x-direction toward the excavating machine 10, the more sand that accumulates in the apparatus 25. Indeed, a significant amount of sand may accumulate in the apparatus 25 even though the apparatus 25 is never submerged more than a small distance (e.g., a few inches) below the original surface line of the sand. Note that the apparatus 25 can be pivoted about the boom section 22 as it travels toward the excavating machine 10 to help scoop the sand being accumulated in the apparatus 25.

Once the apparatus 25 is full or almost full, the excavating machine 10 lifts the apparatus 25 out of the water, and the cab 12, including the boom 17 attached thereto, can be swiveled such that the accumulated sand is moved over dry land at the shore.

The sand can then be dumped on the shore. If desired, the apparatus 25 can then be returned to or close to the point in the sand from which it was previously removed (i.e., the end of the trench being formed) and begin skimming across the ocean floor, as described above, to accumulate additional sand in the apparatus 25 thereby lengthening (in the negative (−) x-direction) the trench being formed. This additional sand can also be dumped on the shore. The aforedescribed methodology may be repeated as desired until the apparatus 25 arrives at or close to the shoreline 32.

Once the apparatus 25 reaches or is otherwise close to the shoreline 32, any sand accumulated and remaining in the apparatus 25 may be dumped on the beach. Referring to FIG. 2, the excavating machine 10 may then move along the shoreline 32 in the z-direction and repeat the aforedescribed procedure in order to form another trench at a different location in the ocean's floor. Indeed, the excavating machine 10 can repeat the same trenching operation over and over as it moves down the beach along the shoreline 32 to form a plurality of parallel trenches. As the excavating machine 10 moves along the shoreline 32, another excavating machine (not shown), such as a bulldozer, may manipulate the piles of sand left by the excavating machine 10 in any desired manner, such as, for example, to spread the piles of sand over the beach in an effort to compensate for beach erosion. Note that since the piles of sand have been moved close to or beyond the shoreline 32 by the excavating machine 10, it is unnecessary for the other excavating machine to contact the ocean's water, thereby helping to prevent corrosion and/or rusting of the other excavating machine.

As described above, the excavating machine 10 can gather piles of sand by performing operations, referred to hereafter as "trenching operations," that form long shallow trenches in the ocean floor. Each trenching operation temporarily forms a small trench in the sand's surface below the surface of the ocean's water. For example, if the apparatus 25 is kept about 6 inches below the sand's original surface as it is being pulled toward the shore, then a trench of approximately 6 inches in depth is made in the sand's surface. However, the wave action of the ocean can quickly fill in the trench with sand from other areas of the ocean. Indeed, even after performing a large number (e.g., thousands) of trenching operations to create a large number (e.g., thousands) of parallel trenches, the wave action of the ocean may quickly fill in the trenches such that it is impossible or extremely difficult to determine, by analyzing the ocean's floor, that the trenching operations ever occurred. However, the trenching operations may have moved a significant amount of sand from the ocean's floor to the shore. Moreover, by continuing to perform the trenching operations over an extended period of time, it is possible to compensate for significant beach erosion without a noticeable or significant impact to the contour of the ocean's floor close to the beach even though trenching operations are performed in this same area. Further, gathering sand from the ocean's floor using the excavating machine 10 in the manner described above can be done at a fraction of the cost associated with conventional dredging operations that typically take place in deep water.

Note, however, that the amount of sand accumulated according to the techniques described herein is likely to be much less than the amount of sand accumulated by a typical dredging operation during the same time period. Thus, for significant beach erosion, such as that occurring during hurricanes, a dredging operation may be an attractive option for beach restoration despite the expensive nature of these operations. Nevertheless, the techniques described herein may be used to help maintain a beach over time and/or to adequately compensate for less significant beach erosion. Further, utilization of the techniques described herein may reduce the frequency and/or amount of dredging operations needed to achieve a desired beach environment.

As described above, the ocean's wave action deposits sand in the trenches formed by the excavating machine 10. Such effect is greatest in regions where waves are breaking. Thus, it is generally desirable to perform the trenching operations in such regions so that adverse effects to the ocean's floor by the trenching operations are quickly mitigated by the ocean. Accordingly, the trenching operations described herein are preferably performed between the shoreline 32 and a line 38, referred to as the "break line," that marks where waves begin to break as the waves are coming toward shore. In this regard, it is generally well-known that a wave begins to break when it reaches a point where the ocean depth is less than about 1.3 times the wave's height.

Moreover, the distance of the break line 38 from shore, as well as the location of the shoreline 32, can vary according to various environmental conditions, such as varying depths of the ocean floor, current fluctuations, changing tide conditions, etc. However, at a particular time and location, the approximate positions of the shoreline 32 and break line 38, in most cases, are easily discernable by simply observing the ocean from shore. Moreover, at the time and location that a trenching operation is being performed, it is generally desirable for the trench to be formed between the shoreline 32 and the break line 38. Thus, during a trenching operation, depending on the depth of the ocean's floor, it is likely that waves will be breaking on the excavating apparatus 25 as it is being skimmed across the ocean's floor. Note that it is possible to begin a trenching operation beyond the break line 38 where waves have yet to begin breaking. However, in such region, it will likely take more time for a trench of the same depth to be completely refilled with sand by the ocean as compared to the region between the shoreline 32 and break line 38.

As described above, various types of excavating machines may be used to perform the trenching operations described herein. For example, the blade of a bulldozer may be used to skim the surface of the sand under the water's surface in order to push piles of sand to the shore. However, the distance that the bulldozer may move in the x-direction into the water is somewhat limited for most conventional bulldozer designs since it is important to ensure that several critical components, such as the engine, of the bulldozer do not become submerged in water. It is possible to modify the design of a conventional bulldozer such that it is able to operate in deeper water and, therefore, be more effective in performing trenching operations. Further, other known or future-developed excavating machines may be used or modified for use in the trenching operations described herein. Such excavating machines may use an excavating apparatus similar to that of the excavating machine 10 depicted in FIG. 1. Alternatively, the excavating machines may use another type of excavating apparatus, such as, for example, a blade similar to the ones commonly employed by conventional bulldozers. Various other designs of the excavating apparatus 25 are possible.

The excavating machine 10 described above is advantageously able to move the apparatus 25 relatively far in the x-direction without submerging various critical components, such as the machine's engine, in water. Indeed, only the apparatus 25 and portions of the boom 17 are actually submerged in water in an embodiment described above. Minimizing the parts that are submerged in the ocean's water helps to minimize the corrosive effects that ocean water can have on excavating machines. Nevertheless, after performing trenching operations as described herein, it may be desirable to rinse the excavating machine 10 and, in particular, any components submerged in the ocean's water with freshwater. Further, it may be useful to mix a lubricant with the freshwater and to rinse the excavating machine with the mixture. By rinsing the excavating machine 10 after performing the trenching operations, its operational life may be prolonged, and maintenance costs may be reduced.

As described above, large sand piles can be pulled from the ocean by the trenching operations even though the excavating apparatus 25 is submerged only a short depth (e.g., a few inches) in the sand. Preferably, the depth that the excavating apparatus 25 is submerged in sand is limited in order to limit the effects of the trenching operation to the ocean's floor. In this regard, deeper trenches formed by submerging the excavating apparatus 25 deeper into the sand generally take longer to be refilled with sand by the wave action of the ocean. However, in some areas, depending on environmental conditions, such as ocean currents at the location of the trenching operations, the trenches may be refilled more quickly making it possible to form deeper trenches without significantly increasing the time that it takes for the trenches to be completely refilled. Moreover, in some embodiments, it may be desirable to study environmental factors, such as ocean currents at the location of the trenching operations, and to select the depth of the trenches (i.e., the depth that the excavating apparatus 25 is to be submerged in the sand) based on such factors.

In general, it is believed that trenches less than approximately 6 inches to 1 foot can be completely refilled with sand by the ocean within less than a day for many beaches. However, it is possible, depending on environmental conditions, for such depth to be increased without a significant impact to the time that it takes for the ocean to fill in the trenches. Indeed, it is believed that depths of approximately 1½ feet to 2 feet at some beaches are possible without significantly increasing the time necessary for the ocean to fill in the trenches. Moreover, various trench depths are possible.

An exemplary methodology for compensating beach erosion will be described below with particular reference to FIG. 4. For the purposes of this illustration, assume that the excavating machine 10 being used is an excavator, such as depicted in FIG. 1.

Figure 4:
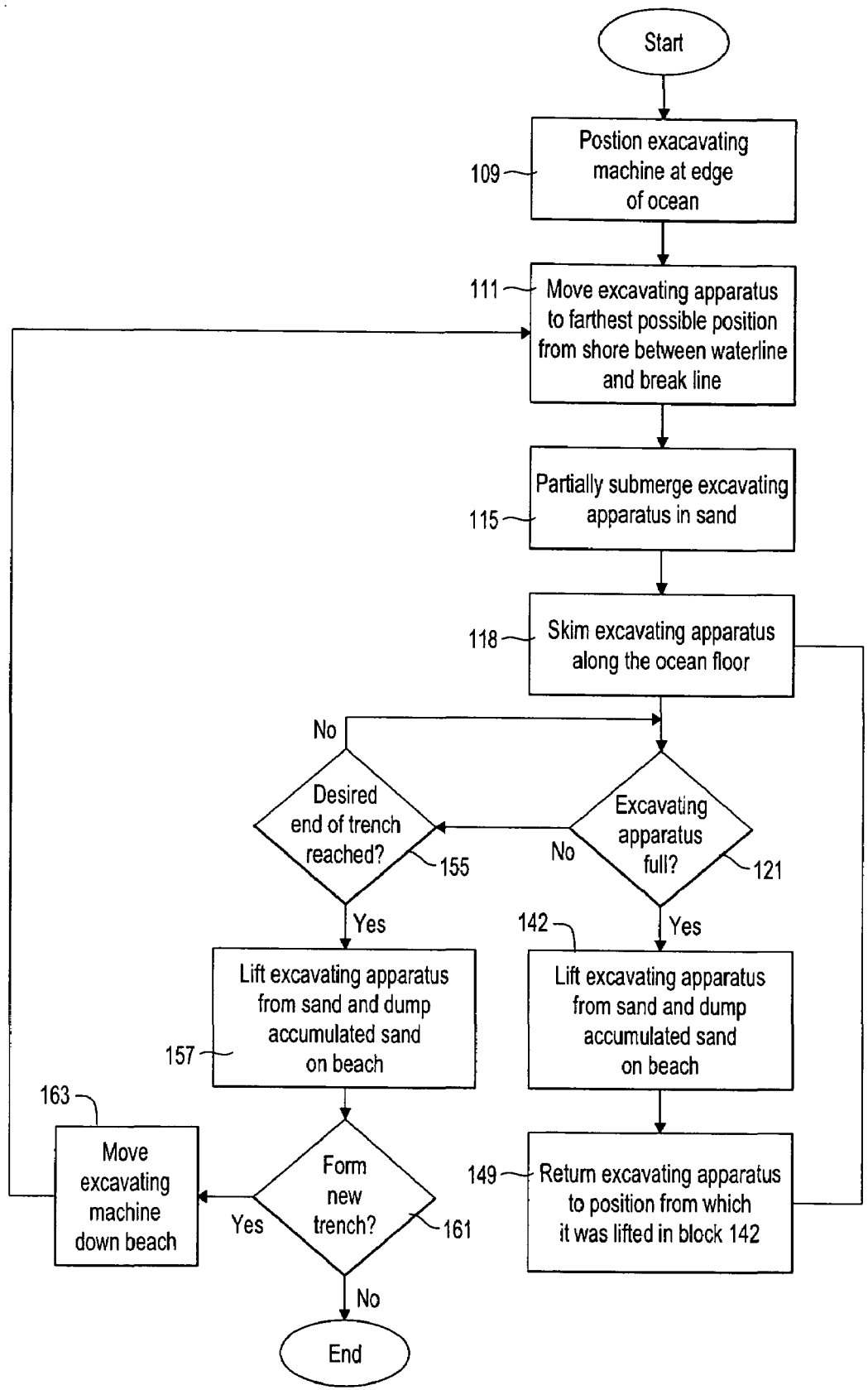
FIG. 4 is a flow chart illustrating an exemplary methodology for performing trenching operations in accordance with the present disclosure.

Initially, as depicted by block 109 of FIG. 4, the excavating machine 10 is positioned at the edge of an ocean close to the shoreline 32 but on a side of the shoreline 32 opposite of the ocean so that waves do not hit the base 18 of the machine 10. As shown by FIG. 1 and block 111, the boom 17 is extended so that it reaches over the water's surface to position the apparatus 25 at the farthest possible position in the x-direction from shore between the shoreline 32 and the break line 38. The boom section 22 is then pivoted about point 23 so that the apparatus 25 is lowered in the water and eventually contacts the ocean's floor as shown by FIG. 1. The apparatus 25 is then moved and/or lowered so that the teethed lip of the apparatus 25 penetrates the sand on the ocean's floor and the apparatus 25 is partially submerged in such sand, as depicted by FIG. 3 and block 115 of FIG. 4.

Note that the selection of the depth of the apparatus 25 in the sand can be based on many factors. In this regard, submerging the apparatus 25 deeper in the sand causes the apparatus 25 to accumulate more sand per trench by digging a deeper trench. However, as described above, increasing the depth of a trench generally increases the time that it takes for the ocean to refill the trench. In addition, stronger currents tend to generate greater wave action helping to refill trenches quicker. Thus, the selection of the trench depth might be based on the amount of sand needed for beach compensation, desired time for the trenches to be refilled, ocean current strength, and/or other factors. In many instances, it is expected that trenches having depths of about 6 inches to 1 foot can be completely refilled within a short period of time, such as within about a day, and it is expected that such depths would be preferred. However, particularly in locations having strong wave action, other depths are possible.

Figure 5:
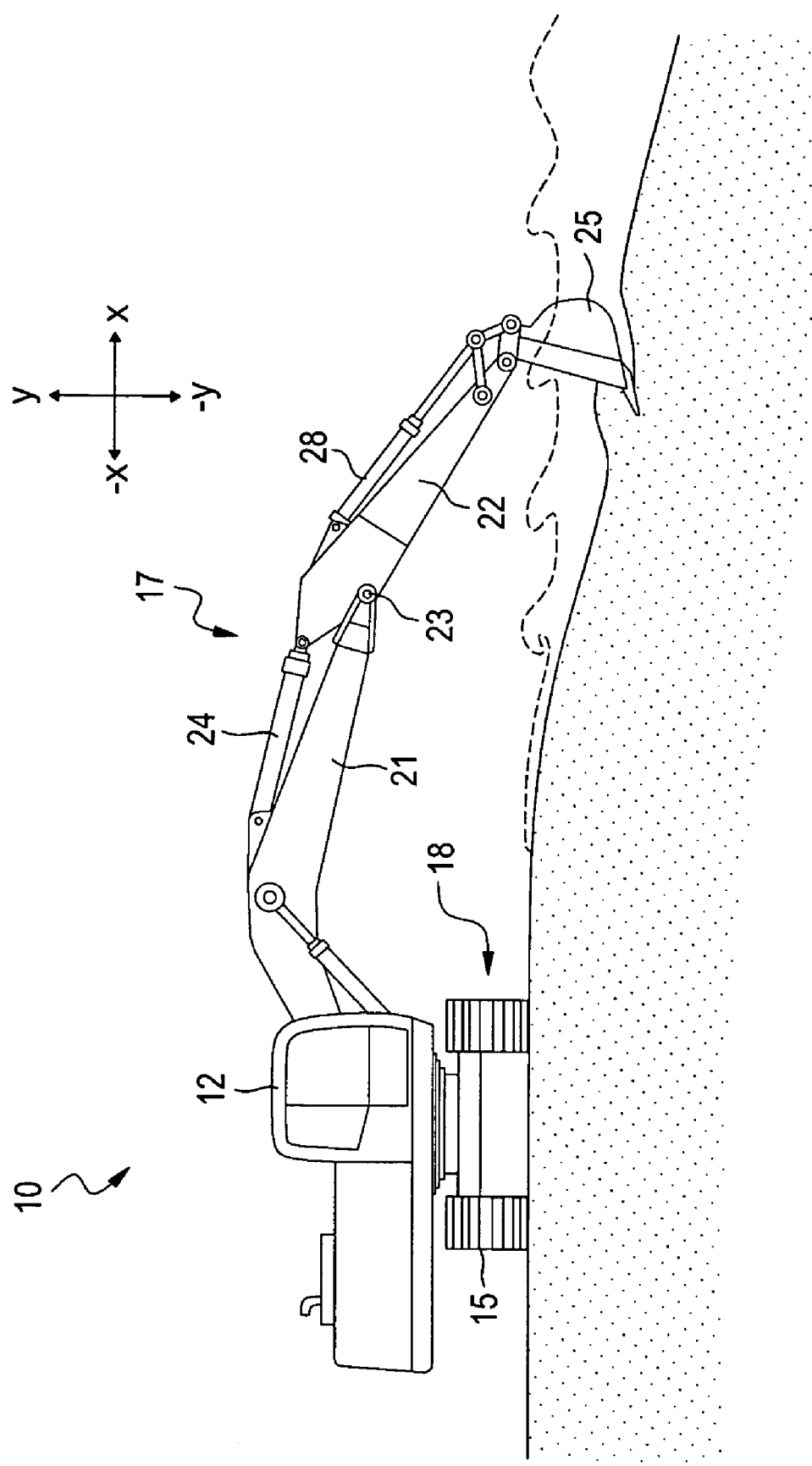
FIG. 5 illustrates the excavating machine of FIG. 1 when the excavating apparatus of FIG. 3 is initially inserted in the sand for a trenching operation.
Figure 6:
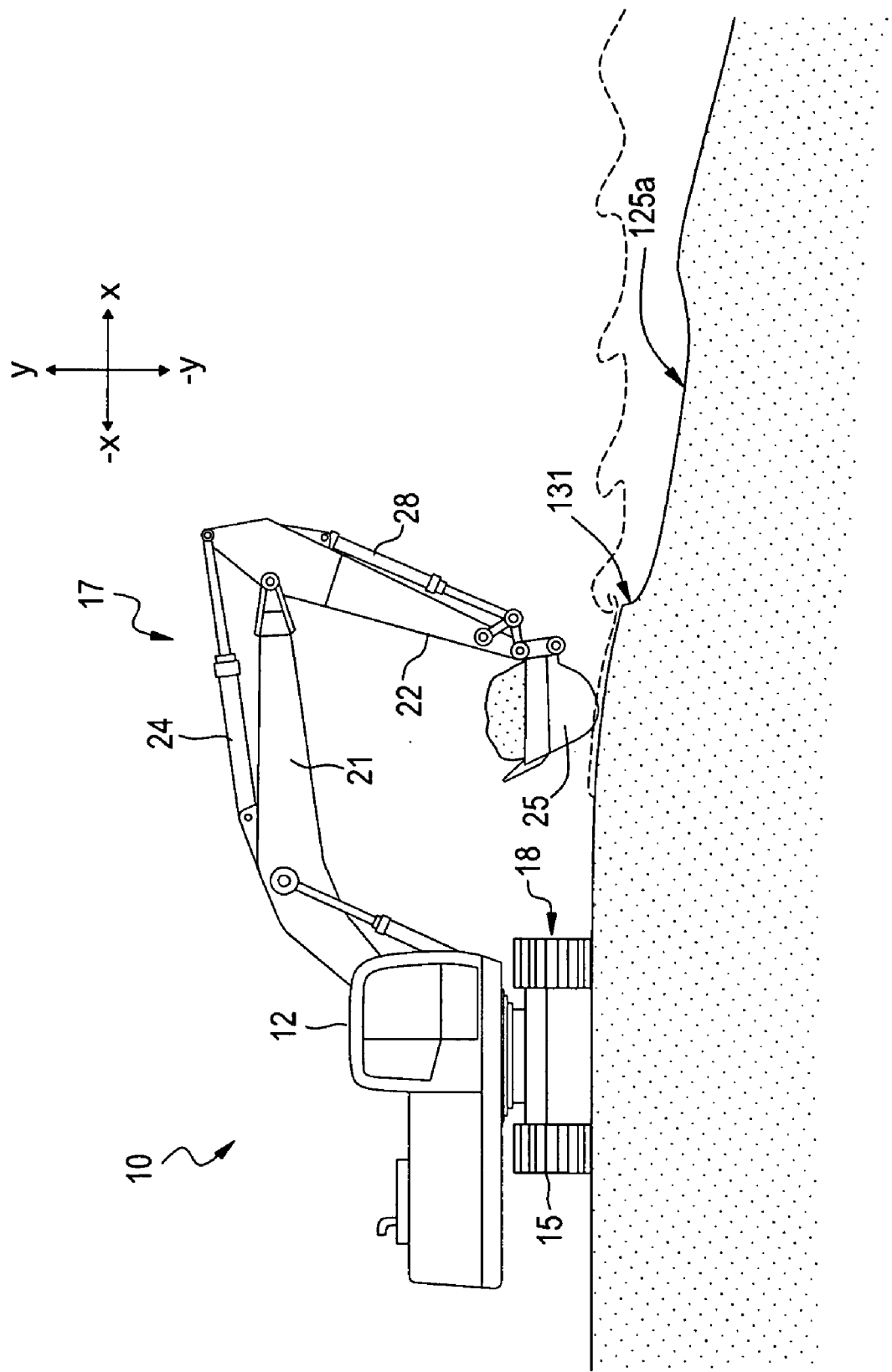
FIG. 6 illustrates the excavating machine of FIG. 1 after it has lifted the excavating apparatus out of the ocean.
Figure 7:
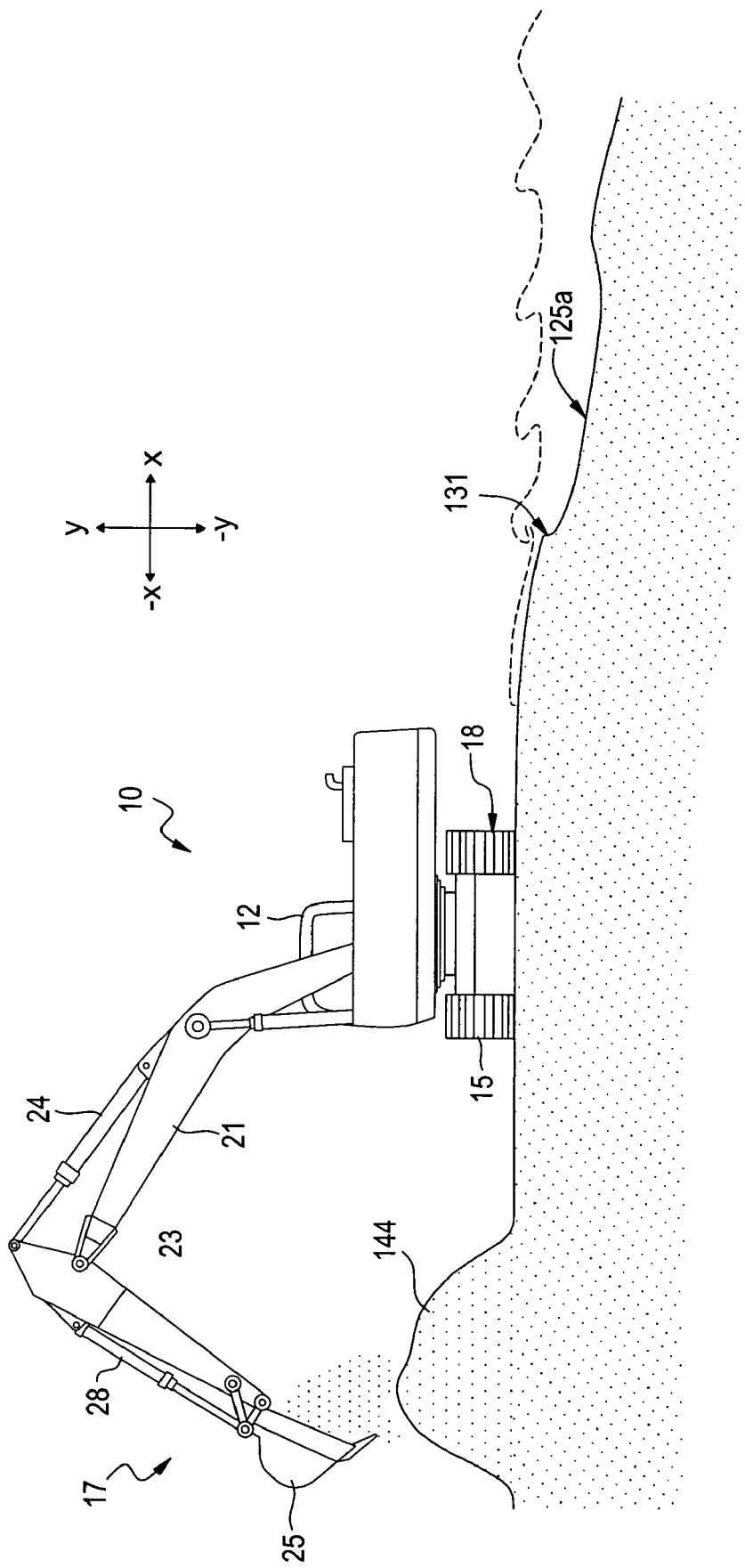
FIG. 7 illustrates the excavating machine of FIG. 1 as it is dumping sand accumulated from a trenching operation.
Figure 8:
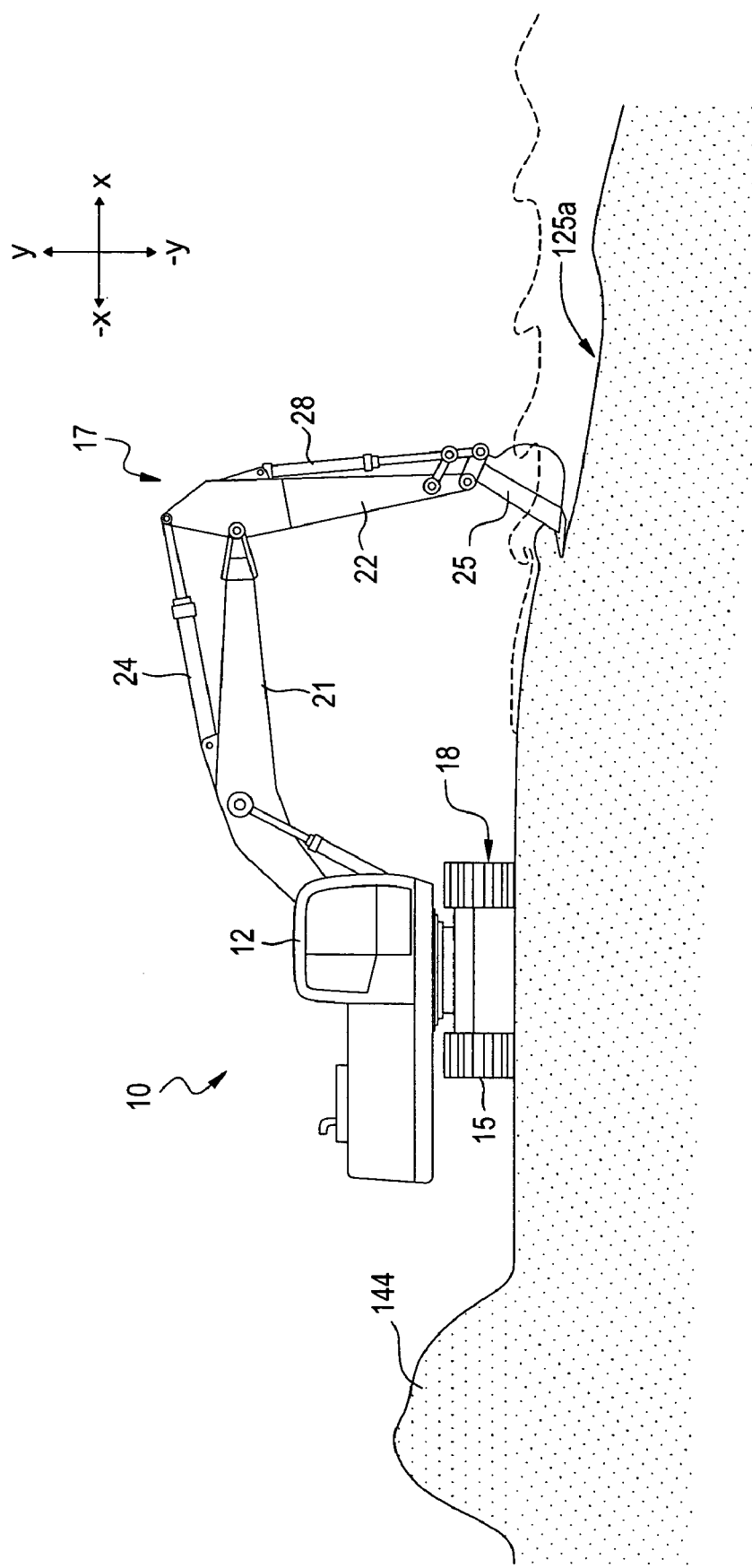
FIG. 8 illustrates the excavating machine of FIG. 1 once it has returned the excavating apparatus to the trench after dumping sand on the beach.
Figure 9:
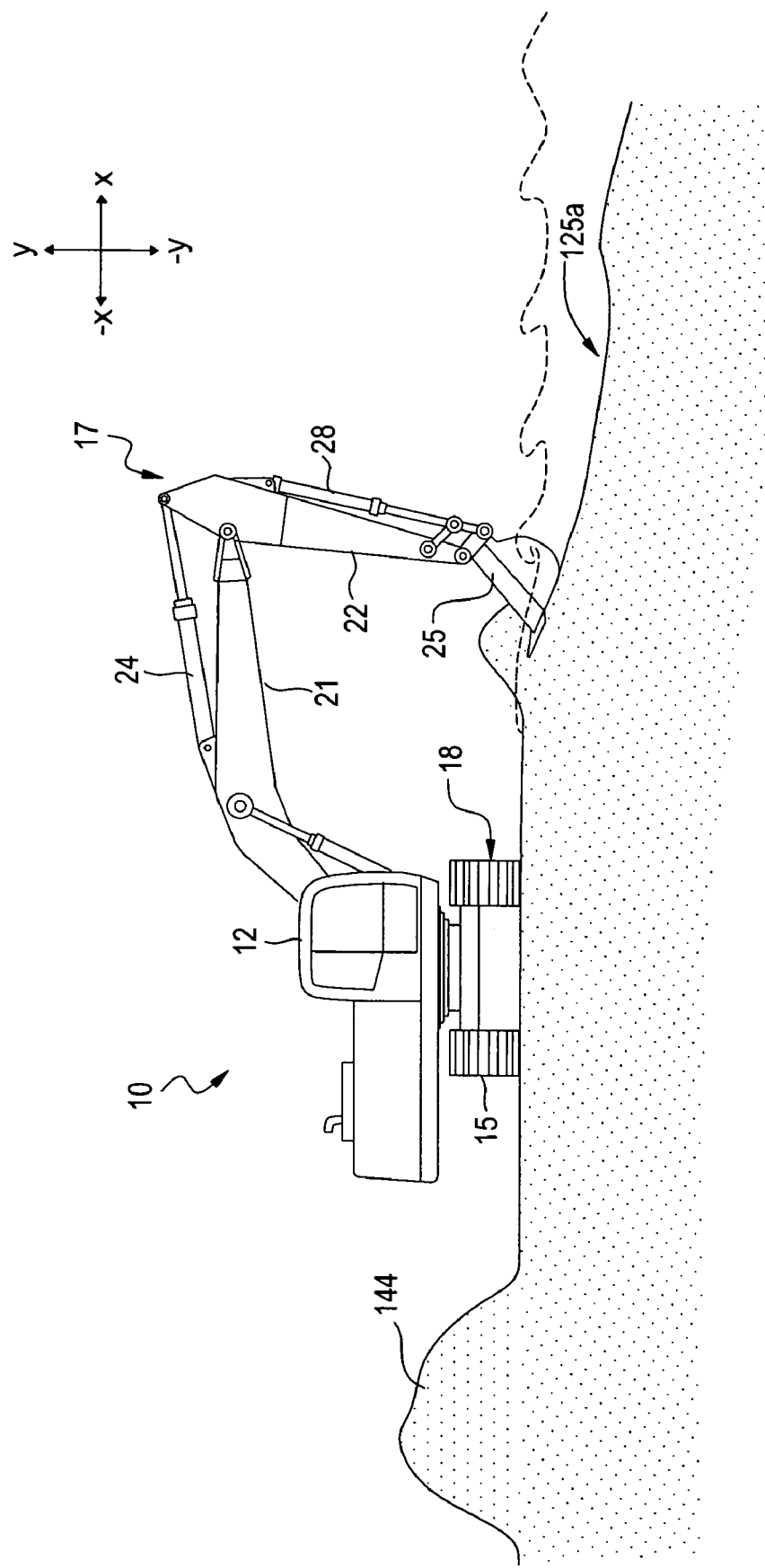
FIG. 9 illustrates the excavating machine of FIG. 1 once the excavating apparatus has reached the desired end of the trench being formed.

After submerging the apparatus 25 to the desired depth, the apparatus 25 is skimmed across the ocean floor keeping the apparatus 25 at the same approximate depth in the sand thereby accumulating sand in the apparatus 25 and forming a trench, as depicted by FIG. 5 and block 118 of FIG. 4. As an example, refer to FIG. 2, which depicts a plurality of parallel trenches 125a-h formed in the ocean's floor according to the trenching operations being described. Assume that trench 125a is the one being formed in the instant example. As shown by blocks 118 and 121 of FIG. 4, skimming of the floor surface is continued, thereby lengthening the trench 125a in the negative (−) x-direction, until the apparatus 25 becomes substantially full of sand. For illustrative purposes, assume that the apparatus 25 becomes substantially full of sand when it reaches point 131 (FIG. 6). When this occurs, the apparatus 25 is lifted out of the sand and is simultaneously pivoted about the end of the boom section 22 thereby scooping the sand so that most of the sand accumulated in the apparatus 25 remains therein as the apparatus 25 is being lifted. As depicted by block 142 of FIG. 4, as well as FIGS. 6 and 7, the apparatus 25 is lifted out of the water and moved over the beach where the sand is dumped adding to or forming part of a mound 144 (FIG. 2) of sand on the beach. As depicted by block 149 and FIG. 8, the apparatus 25 is returned to the point 131 where it was lifted from the sand, and the apparatus 25 is again skimmed along the surface of the ocean floor further extending the trench 125a in the negative (−) x-direction.

The trenching operation is continued in the described manner until the apparatus 25 reaches the desired end of the trench 125a being formed. The desired end can be at any point. However, to ensure that the wave action of the ocean is able to completely refill the trench 125a with sand within a short time period, such as within about a day, it is generally desirable to prevent the trench 25a from crossing the shoreline 32. Thus, the desired end of the trench 125a is preferably somewhere between the start of the trench 125a and the shoreline 32. Once the desired end of the trench 125a has been reached, the apparatus 25 is lifted out of the sand, as depicted by blocks 155 and 157 of FIG. 4. As described above for block 142, the apparatus 25 can be pivoted about the end of the boom section 22 as it is being lifted in order to scoop any sand that has accumulated in the apparatus 25. Further, after lifting the apparatus 25 out of the sand, the apparatus 25 is preferably moved over the shore to dump the sand thereon (e.g., on mound 144).

At this point, formation of trench 125a is complete. If another trench is to be formed, the excavating machine 10 is moved down the beach a short distance (e.g., a few feet) in the z-direction, as depicted by blocks 161 and 163, and the aforedescribed process is repeated by returning to block 111 to form another trench. In the example depicted by FIG. 2, the trenches 125a-h can be successively formed according to the techniques described above and indicated by FIG. 4. As a result, the mound 144 is lengthened in the z-direction as more trenches 125a-h are formed, and this mound 144 can contain a significant amount of sand with which to compensate for beach erosion. Indeed, as the excavating machine 10 is forming additional trenches, another excavating machine (not shown), such as a bulldozer, may be used to spread the sand of the mound 144 over the beach in any desired manner.

As soon as each trench 125a-h is formed, the wave action of the ocean begins to deposit sand in the trench. Eventually, the trench should be completely refilled with sand so that there is no noticeable effect from the trenching operations to the ocean's floor after a short amount of time has elapsed.

The invention claimed is:

1. A method for compensating for beach erosion, comprising the steps of:
    positioning an excavating machine on a beach;
    extending a boom of the excavating machine over ocean water, the boom coupled to an excavating apparatus;
    submerging the excavating apparatus into the ocean water in a region where waves of the ocean water are breaking;
    partially submerging the excavating apparatus in sand of an ocean floor below the breaking waves;
    skimming the partially submerged excavating apparatus along the ocean floor toward shore thereby forming a trench within the ocean floor below the breaking waves;
    moving, via the excavating apparatus, the sand from the trench to the shore;
    spreading the sand across the shore thereby compensating for beach erosion;
    analyzing ocean currents at the beach; and
    determining, based on the analyzing step, a depth to submerge the excavating apparatus during the submerging step,
    wherein the submerging step is based on the determining step and wherein wave action of the breaking waves is sufficient to fill the trench with sand such that a contour of the ocean floor is substantially unaffected by the skimming step.

2. The method of claim 1, wherein the excavating apparatus is a bucket.

3. The method of claim 2, wherein the excavating machine is an excavator.

4. The method of claim 2, further comprising the steps of:
    lifting the bucket from the ocean floor; and
    dumping, on the shore, the sand accumulated in the bucket during the skimming step.

5. The method of claim 4, further comprising the steps of:
    returning the bucket to a point on the ocean floor from which the bucket was lifted in the lifting step; and
    skimming the bucket along the ocean floor toward shore from said point.

6. The method of claim 5, further comprising the steps of:
    moving the excavating machine to different positions down the beach;
    at each of the positions, repeating the extending, submerging, partially submerging, skimming, lifting, and dumping steps.

7. The method of claim 1, wherein the excavating apparatus, via the partially submerging step, is submerged in the sand to a depth of less than approximately 1 foot from a surface of the ocean floor.

8. The method of claim 7, wherein the depth of the excavating apparatus within the ocean floor is kept below approximately 1 foot during the skimming step.

9. The method of claim 1, wherein the positioning step is performed such that a base of the excavating machine rests on the shore without being struck by the breaking waves.

10. The method of claim 1, wherein the excavating apparatus is submerged in the sand to a depth of less than approximately one foot, and wherein the skimming step is performed until the excavating apparatus is full of the sand.

11. A method for compensating for beach erosion, comprising the steps of:
    positioning an excavating machine on a beach, the excavating machine having a bucket;
    submerging at least a portion of the bucket in sand below a surface of ocean water within a proximity of a shore where ocean waves are breaking;
    moving the bucket toward the shore while the portion is submerged in the sand such that a pile of sand is pushed by the bucket toward the shore thereby forming a trench in the surface below the breaking waves;
    spreading the pile of sand across the shore;
    analyzing ocean currents at the beach; and
    determining, based on the analyzing step, a depth to submerge the excavating apparatus during the submerging step,
    wherein the submerging step is based on the determining step and wherein wave action of the breaking waves is sufficient to completely fill the trench with sand.

12. The method of claim 11, wherein the excavating machine is an excavator.

13. The method of claim 11, wherein the excavating apparatus is submerged less than approximately 1 foot in the sand during the moving step.

14. The method of claim 11, wherein the positioning step is performed such that a base of the excavating machine rests on the shore without being struck by the waves during the submerging and the moving.

15. A method for compensating for beach erosion, comprising the steps of:
    providing an excavating machine having an excavating apparatus;
    moving the excavating apparatus over a surface of an ocean while the excavating machine is positioned on a shore;
    submerging at least a portion of the excavating apparatus in sand below a surface of the ocean;
    skimming the excavating apparatus across a floor of the ocean while the portion is submerged in the sand thereby pushing the sand toward shore and forming a trench in the surface below breaking waves of the ocean;
    placing the pushed sand on the shore;
    spreading the sand over the shore;
    analyzing currents in the ocean; and
    determining, based on the analyzing step, a depth to submerge the excavating apparatus during the submerging step,
    wherein the submerging step is based on the determining step and wherein wave action of the breaking waves is sufficient to fill the trench with sand such that a contour of the ocean floor is substantially unaffected by the skimming step.

16. The method of claim 15, wherein the excavating apparatus is a bucket.

17. The method of claim 16, wherein the excavating machine is an excavator.

18. The method of claim 15, further comprising the step of moving the excavating machine along a shoreline and repeating the extending, submerging, and skimming steps at a new location.

19. The method of claim 15, wherein the spreading step is performed by another excavating machine.

20. A method for compensating for beach erosion, comprising the steps of:
    (a) positioning an excavating machine on a beach, the excavating machine having an excavating apparatus;
    (b) partially submerging the excavating apparatus in sand below a surface of ocean water within a proximity of a shore where ocean waves are breaking;
    (c) moving the excavating apparatus toward the shore while the excavating apparatus is partially submerged in the sand such that a pile of sand is pushed by the excavating apparatus toward the shore, thereby forming a trench in an ocean floor, wherein a depth of the trench is less than approximately 2 feet from a beginning of the trench to an end of the trench and wherein wave action by the breaking waves is sufficient to completely fill the trench with sand;

(d) repeating the steps (b) and (c) at different locations along the beach thereby forming a plurality of parallel trenches;

(e) spreading the sand from each of the trenches formed via the step (c) across the shore;

(f) analyzing ocean currents at the beach; and (g) determining, based on the analyzing step, a depth to submerge the excavating apparatus during the submerging step, wherein the submerging step is based on the determining step.

21. The method of claim 20, wherein the excavating apparatus is a bucket.

22. The method of claim 21, wherein the excavating machine is an excavator.

* * * * *